(12) United States Patent
Liu et al.

(10) Patent No.: US 11,026,238 B2
(45) Date of Patent: Jun. 1, 2021

(54) METHOD AND DEVICE FOR CONFIGURING SEMI-PERSISTENT SCHEDULING

(71) Applicant: Telefonaktiebolaget LM Ericsson (publ), Stockholm (SE)

(72) Inventors: Jinhua Liu, Beijing (CN); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/318,585

(22) PCT Filed: Apr. 20, 2018

(86) PCT No.: PCT/CN2018/083888
§ 371 (c)(1),
(2) Date: Jan. 17, 2019

(87) PCT Pub. No.: WO2018/201917
PCT Pub. Date: Nov. 8, 2018

(65) Prior Publication Data
US 2019/0281606 A1      Sep. 12, 2019

(30) Foreign Application Priority Data

May 5, 2017     (WO) ................. PCT/CN2017/083249

(51) Int. Cl.
*H04W 72/08*         (2009.01)
*H04L 5/00*          (2006.01)
(Continued)

(52) U.S. Cl.
CPC ......... *H04W 72/085* (2013.01); *H04L 5/0082* (2013.01); *H04W 72/042* (2013.01); *H04W 72/0446* (2013.01); *H04W 72/12* (2013.01)

(58) Field of Classification Search
CPC . H04W 72/085; H04W 72/042; H04W 72/00; H04W 72/12; H04W 72/1205;
(Continued)

(56) References Cited

U.S. PATENT DOCUMENTS

| 10,321,447 B2* | 6/2019 | Rico Alvarino .... H04W 72/042 |
| 2010/0177723 A1* | 7/2010 | Kim ....................... H04L 5/0048 |
| | | 370/329 |

(Continued)

FOREIGN PATENT DOCUMENTS

| CN | 105592557 A | 5/2016 |
| CN | 106465391 A | 2/2017 |

(Continued)

OTHER PUBLICATIONS

Unknown, Author, "Discussion on SPS", 3GPP TSG-RAN WG2 Meeting #97bis; R2-1703123; Spokane, USA, Apr. 3-7, 2017, pp. 1-2.
(Continued)

*Primary Examiner* — Warner Wong
(74) *Attorney, Agent, or Firm* — Murphy, Bilak & Homiller, PLLC

(57) ABSTRACT

A method and device for configuring semi-persistent scheduling (SPS). Information on transmission or reception opportunity is included in SPS configuration when a network device configures the SPS for a terminal device. Therefore, SPS operation with multiple duration (such as slot and/or mini-slot) is enabled and there may be match between the network device and the terminal device when SPS transmission occupy just slots or mini-slots within one subframe.

22 Claims, 7 Drawing Sheets

(51) Int. Cl.
*H04W 72/04* (2009.01)
*H04W 72/12* (2009.01)

(58) Field of Classification Search
CPC .......... H04W 72/1625; H04W 72/0446; H04L 5/0082; H04L 2012/5679; H04L 29/08945; H04L 74/00; H04L 74/04
See application file for complete search history.

(56) References Cited

U.S. PATENT DOCUMENTS

| | | | | |
|---|---|---|---|---|
| 2013/0242883 | A1* | 9/2013 | Kalyanasundaram | H04L 1/1861 370/329 |
| 2018/0092122 | A1* | 3/2018 | Babaei | H04W 72/14 |
| 2018/0324839 | A1* | 11/2018 | Feng | H04L 5/0053 |
| 2018/0331792 | A1* | 11/2018 | Yang | H04L 1/0086 |
| 2019/0045507 | A1* | 2/2019 | Sorrentino | H04W 4/40 |
| 2019/0149279 | A1* | 5/2019 | Lee | H04L 1/1822 370/329 |
| 2019/0166621 | A1* | 5/2019 | Yerramalli | H04W 16/14 |
| 2019/0289624 | A1* | 9/2019 | Dudda | H04W 72/1289 |
| 2019/0357180 | A1* | 11/2019 | Miao | H04W 72/12 |
| 2020/0092849 | A1* | 3/2020 | Zhang | H04L 5/0058 |
| 2020/0112402 | A1* | 4/2020 | Ai | H04W 72/12 |
| 2020/0120466 | A1* | 4/2020 | Rajagopal | H04L 67/12 |
| 2020/0304244 | A1* | 9/2020 | Xiao | H04L 1/1607 |
| 2020/0314855 | A1* | 10/2020 | Lee | H04L 5/0098 |
| 2020/0329489 | A1* | 10/2020 | Li | H04W 76/27 |
| 2020/0344795 | A1* | 10/2020 | Bagheri | H04W 72/042 |

FOREIGN PATENT DOCUMENTS

| | | |
|---|---|---|
| EP | 2807776 A2 | 12/2014 |
| EP | 3499995 A1 | 6/2019 |
| EP | 3567966 A1 | 11/2019 |
| WO | 2017052706 A1 | 3/2017 |
| WO | 2017053637 A1 | 3/2017 |
| WO | 2017070842 A1 | 5/2017 |

OTHER PUBLICATIONS

Unknown, Author, "Introduction of SPS into short TTI", 3GPP TSG-RAN WG2 Meeting #97bis; R2-1703645; Spokane, USA, Apr. 3-7, 2017, pp. 1-3.

Unknown, Author, "SPS operation on sTTI", 3GPP TSG-RAN WG2 #97; Tdoc R2-1701610; Athens, Greece, Feb. 13-17, 2017, pp. 1-3.

"3GPP TS 36.321 V12.4.0"; 3rd Generation Partnership Project; Technical Specification Group Radio Access Network; Evolved Universal Terrestrial Radio Access (E-UTRA); Medium Access Control (MAC) protocol specification (Release 12), Dec. 2014, pp. 1-60.

* cited by examiner

METHOD AND DEVICE FOR CONFIGURING SEMI-PERSISTENT SCHEDULING

TECHNICAL FIELD

Embodiments of the present disclosure generally relate to the field of communications, and more particularly, to a method and device for configuring semi-persistent scheduling (SPS).

BACKGROUND

This section introduces aspects that may facilitate better understanding of the present disclosure. Accordingly, the statements of this section are to be read in this light and are not to be understood as admissions about what is in the prior art or what is not in the prior art.

Semi-persistent scheduling (SPS) is one important feature to preconfigure granted resources for a terminal device (such as user equipment, UE) so that the UE can transmit data with the granted resources, or a network device can transmit data to the UE in pre-allocated resources.

There are some benefits for SPS, for example, overhead of control channel is saved or decreased. Since resources for multiple transmission opportunities are pre-allocated for the UE, there is no need to transmit physical downlink control channel (PDCCH) to schedule data transmissions after SPS configuration is activated. It can also save physical uplink control channel (PUCCH) resource for scheduling request (SR) transmission since SR transmission is not needed if SPS configuration is activated.

For another example, latency for data transmission in uplink (UL) is reduced or decreased. The considerable delay for SR TX, grant reception and UL data transmission for UL with dynamic scheduling is saved when UL data is transmitted with pre-allocated resources according to the activated SPS configuration.

SUMMARY

However, it has been found that the current SPS configuration defined based on a subframe does not consider transmission duration or reception duration, such as a mini-slot and/or a slot, for new radio (NR). Although a network device and a terminal device can determine the same subframe which is used for SPS transmission, the network device and the terminal device don't know which slot or mini-slot within this subframe is used for SPS transmission.

Then there will be mismatch between the network device and the terminal device when SPS transmission occupy just slots or mini-slots within one subframe. The formulas and parameters to configure the SPS configurations should be improved to support SPS configuration with mini-slot/slot operation.

In order to solve at least part of the above problems, methods, apparatus, devices and computer programs are provided in the present disclosure. It may be appreciated that embodiments of the present disclosure are not limited to a wireless system operating in NR network, but could be more widely applied to any application scenario where similar problems exist.

Various embodiments of the present disclosure mainly aim at providing methods, devices and computer programs for controlling a transmission between a transmitter and a receiver, for example, in a shared frequency band. Either of the transmitter and the receiver could be, for example, a terminal device or a network device. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for configuring SPS. Information on transmission duration or reception duration (it may be referred to as information on transmission or reception opportunity) is included in SPS configuration when the network device configures the SPS for the terminal device.

In a first aspect, there is provided a method in a network device for configuring SPS, the method includes: determining semi-persistent scheduling configuration for a terminal device; and transmitting the semi-persistent scheduling configuration to the terminal device. Information on transmission or reception opportunity is included in the semi-persistent scheduling configuration.

In one embodiment, the information on transmission or reception opportunity may include one or more of the following time units: frame, subframe, slot, mini-slot, orthogonal frequency division multiplexing symbol, transmission time interval.

In one embodiment, the information on transmission or reception opportunity includes a time duration and occurrence time.

In one embodiment, a semi-persistent scheduling interval may be configured in number of the following time units: frame, subframe, slot, mini-slot, orthogonal frequency division multiplexing symbol, transmission time interval.

In one embodiment, the information on transmission or reception opportunity at least comprises information on slot and/or mini-slot configuration; and the information on slot and/or mini-slot configuration is used to indicate the number of orthogonal frequency division multiplexing symbols in a slot and/or min-slot.

In one embodiment, the information on slot and/or mini-slot configuration is further used to indicate numerology configuration over which the semi-persistent scheduling configuration is to be operated.

In one embodiment, the slot and/or mini-slot may be defined by the number of orthogonal frequency division multiplexing symbols of an indicated numerology.

In one embodiment, a transmission opportunity or reception opportunity of the semi-persistent scheduling configuration is predefined or is configured with a parameter; a set of transmission opportunity or reception opportunity configurations are predefined and the parameter is used to indicate an index of a transmission opportunity or reception opportunity configuration.

In one embodiment, the method further includes: determining a transmission opportunity or a reception opportunity by using an index.

In one embodiment, the transmission opportunity or the reception opportunity is calculated based on one or more of a slot, mini-slot and orthogonal frequency division multiplexing symbol.

In one embodiment, the transmission opportunity or the reception opportunity for downlink within a semi-persistent scheduling period is derived based on the following formula: $(X*SFN+slot)=[(X*SFN_{start\ time}+slot_{start\ time})+N*semiPersistSchedIntervalDL]$ modulo $(1024*X)$; where X is the total number of slots or mini-slots in a radio frame, SFN indicates system frame number, semiPersistSchedIntervalDL indicates the semi-persistent scheduling interval in the downlink, slot indicates the index of the slot or mini-slot, N indicates the index of the transmission opportunity or the reception opportunity.

In one embodiment, the transmission opportunity or the reception opportunity for uplink within a semi-persistent scheduling period is derived based on the following formula: $(X*SFN+slot)=[(X*SFN_{start\ time}+slot_{start\ time})+N*semiPersistSchedIntervalUL+Slot\_Offset*(N\ modulo\ 2)]$ modulo $(1024*X)$; where X is the total number of slots or mini-slots in a radio frame, SFN indicates system frame number, Slot_Offset is a predefined value according to a radio frame or subframe structure, semiPersistSchedIntervalUL indicates the semi-persistent scheduling interval in the uplink, slot indicates the index of the slot or mini-slot, N indicates the index of the transmission opportunity or the reception opportunity.

In one embodiment, an index of the slot and/or mini-slot for data transmission within the subframe is indicated by downlink control information to activate the semi-persistent scheduling configuration, or is predefined when the transmission opportunity or reception opportunity is calculated based on a subframe.

In one embodiment, an index of a slot and/or mini-slot is defined within a radio frame or within a subframe.

In a second aspect, there is provided a method in a terminal device for configuring SPS, the method includes: receiving semi-persistent scheduling configuration from a network device; information on transmission or reception opportunity is included in the semi-persistent scheduling configuration.

In one embodiment, the information on transmission or reception opportunity may include one or more of the following time units: frame, subframe, slot, mini-slot, orthogonal frequency division multiplexing symbol, transmission time interval.

In one embodiment, a semi-persistent scheduling interval may be configured in number of the following time units: frame, subframe, slot, mini-slot, orthogonal frequency division multiplexing symbol, transmission time interval.

In one embodiment, the information on transmission or reception opportunity at least comprises information on slot and/or mini-slot configuration; and the information on slot and/or mini-slot configuration is used to indicate the number of orthogonal frequency division multiplexing symbols in a slot and/or min-slot.

In one embodiment, the information on slot and/or mini-slot configuration is further used to indicate numerology configuration over which the semi-persistent scheduling configuration is to be operated.

In one embodiment, the slot and/or mini-slot may be defined by the number of orthogonal frequency division multiplexing symbols of an indicated numerology.

In one embodiment, a transmission opportunity or reception opportunity of the semi-persistent scheduling configuration is predefined or is configured with a parameter; a set of transmission opportunity or reception opportunity configurations are predefined and the parameter is used to indicate an index of a transmission opportunity or reception opportunity configuration.

In one embodiment, the method further includes: determining a transmission opportunity or a reception opportunity by using an index.

In one embodiment, the transmission opportunity or the reception opportunity is calculated based on one or more of a slot, mini-slot and orthogonal frequency division multiplexing symbol.

In one embodiment, the transmission opportunity or the reception opportunity for downlink within a semi-persistent scheduling period is derived based on the following formula: $(X*SFN+slot)=[(X*SFN_{start\ time}+slot_{start\ time})+N*semiPersistSchedIntervalDL]$ modulo $(1024*X)$; where X is the total number of slots or mini-slots in a radio frame, SFN indicates system frame number, semiPersistSchedIntervalDL indicates the semi-persistent scheduling interval in the downlink, slot indicates the index of the slot or mini-slot, N indicates the index of the transmission opportunity or the reception opportunity.

In one embodiment, the transmission opportunity or the reception opportunity for uplink within a semi-persistent scheduling period is derived based on the following formula: $(X*SFN+slot)=[(X*SFN_{start\ time}+slot_{start\ time})+N*semiPersistSchedIntervalUL+Slot\_Offset*(N\ modulo\ 2)]$ modulo $(1024*X)$; where X is the total number of slots or mini-slots in a radio frame, SFN indicates system frame number, Slot_Offset is a predefined value according to a radio frame or subframe structure, semiPersistSchedIntervalUL indicates the semi-persistent scheduling interval in the uplink, slot indicates the index of the slot or mini-slot, N indicates the index of the transmission opportunity or the reception opportunity.

In one embodiment, an index of the slot and/or mini-slot for data transmission within the subframe is indicated by downlink control information to activate the semi-persistent scheduling configuration, or is predefined when the transmission opportunity or reception opportunity is calculated based on a subframe.

In one embodiment, an index of a slot and/or mini-slot is defined within a radio frame or within a subframe.

In a third aspect, there is provide a network device, including a processor and a memory, wherein the memory containing instructions executable by the processor whereby the network device is operative to perform a method for configuring semi-persistent scheduling according to the first aspect.

In a fourth aspect, there is provide a terminal device, including a processor and a memory, wherein the memory containing instructions executable by the processor whereby the terminal device is operative to perform a method for configuring semi-persistent scheduling according to the second aspect.

In a fifth aspect, there is provide a communications system, including: a network device configured to perform a method for configuring semi-persistent scheduling according to the first aspect; and a terminal device configured to perform a method for configuring semi-persistent scheduling according to the second aspect.

According to various embodiments of the present disclosure, information on transmission or reception opportunity is included in SPS configuration when the network device configures the SPS for the terminal device. Therefore, SPS operation with multiple duration (such as slot and/or mini-slot) is enabled and there may be match between the network device and the terminal device when SPS transmission occupy just slots or mini-slots within one subframe.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
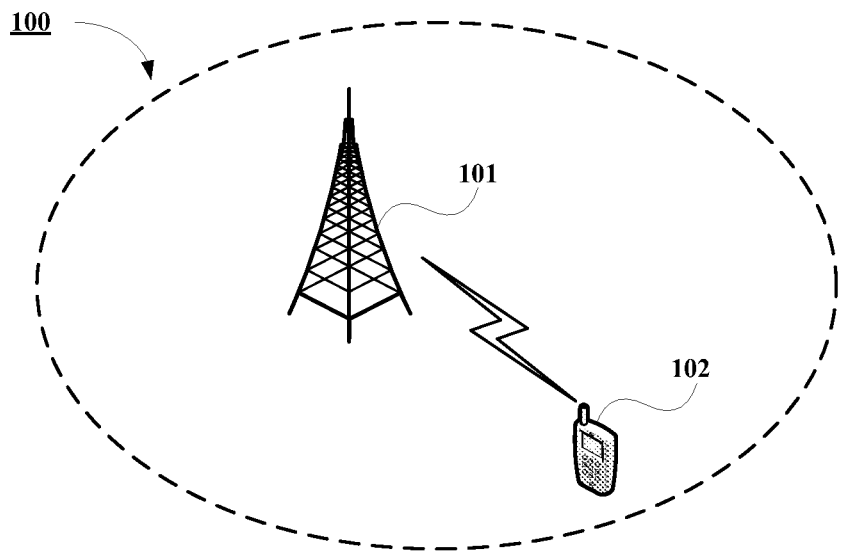
FIG. 1 is a schematic diagram which shows a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-tomachine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Now some exemplary embodiments of the present disclosure will be described below with reference to the figures.

FIG. 1 shows a schematic diagram of a wireless communication network 100 in which embodiments of the disclosure may be implemented. As shown in FIG. 1, the wireless communication network 100 may include one or more network devices, for example network devices 101.

It will be appreciated that the network device 101 could also be in a form of gNB, Node B, eNB, BTS (Base Transceiver Station), and/or BSS (Base Station Subsystem), access point (AP) and the like. The network device 101 may provide radio connectivity to a set of terminal devices or UEs 102-1, 102-2, . . . , 102-N (collectively referred to as "terminal device(s) 102") within its coverage, where N is a natural number.

Although network device 101 illustrated in the example wireless communication network may represent a device that includes a particular combination of hardware components, other embodiments may include network nodes with different combinations of components. It is to be understood that a network device may include any suitable combination of hardware and/or software needed to perform the tasks, features, functions and methods disclosed herein.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

In technical document, such as 36.321-e20 Section 5.10, SPS configuration was specified for LTE in both UL and DL. For example, uplink semi-persistent scheduling interval semiPersistSchedIntervalUL and the number of empty transmissions before implicit release implicitReleaseAfter, if semi-persistent scheduling with semi-persistent scheduling cell radio network temporary identifier (C-RNTI) is enabled for the uplink. For another example, whether twoIntervalsConfig is enabled or disabled for uplink, only for time division duplexing (TDD). For another example, downlink semi-persistent scheduling interval semiPersistSchedIntervalDL and number of configured hybrid automation repeat request (HARQ) processes for semi-persistent scheduling numberOfConfSPS-Processes, if semi-persistent scheduling is enabled for the downlink.

Where, implicitReleaseAfter means the number of empty transmissions before implicit release; semiPersistSchedIntervalUL means the semi-persistent scheduling interval in uplink; semiPersistSchedIntervalDL means the semi-persistent scheduling interval in downlink; twoIntervalsConfig means the trigger of two-intervals-Semi-Persistent Scheduling in uplink; numberOfConfSPS-Processes means the number of configured HARQ processes for Semi-Persistent Scheduling.

To determine a transmission opportunity for data, in an embodiment, DL transmission opportunity may be calculated. For example, after a Semi-Persistent downlink assignment is configured, media access control (MAC) entity may consider sequentially that the $N^{th}$ assignment occurs in the subframe for which: (10*SFN+subframe)=[(10*$SFN_{start\ time}$+$subframe_{start\ time}$)+N*semiPersistSchedIntervalDL] modulo 10240; where $SFN_{start\ time}$ and $subframe_{start\ time}$ are the system frame number (SFN) and subframe, respectively, at the time the configured downlink assignment were (re-)initialised.

In another embodiment, UL transmission opportunity may be calculated. For example, after a Semi-Persistent Scheduling uplink grant is configured, the MAC entity may set the Subframe_Offset according to Table 7.4-1 if twoIntervalsConfig is enabled by upper layer; else may set Subframe_Offset to 0. The MAC entity may consider sequentially that the $N^{th}$ grant occurs in the subframe for which: (10*SFN+subframe)=[(10*$SFN_{start\ time}$+$subframe_{start\ time}$)+N*semiPersistSchedIntervalUL+Subframe_Offset*(N modulo 2)] modulo 10240; where $SFN_{start\ time}$ and $subframe_{start\ time}$ are the SFN and subframe, respectively, at the time the configured uplink grant were (re-)initialised.

For NR, the subframe of 1 ms duration may be defined similarly as LTE. Slot and mini-slots of shorter transmission duration were also agreed in NR by including less than such as 14 orthogonal frequency division multiplexing (OFDM) symbols in a transmission and short OFDM symbols using larger sub-carrier spacing sub-carrier. For SPS configuration with slot/mini-slot, better operation granularity for resource allocation and lower latency can be achieved.

However, there will be mismatch between the network device and the terminal device when SPS transmission occupy just slots or mini-slots within one subframe. The formulas and parameters to configure the SPS configurations should be improved to support SPS configuration with mini-slot/slot operation.

First Aspect of Embodiments

A method for configuring SPS is provided in an embodiment. The method is implemented at a network device as an example.

Figure 2:
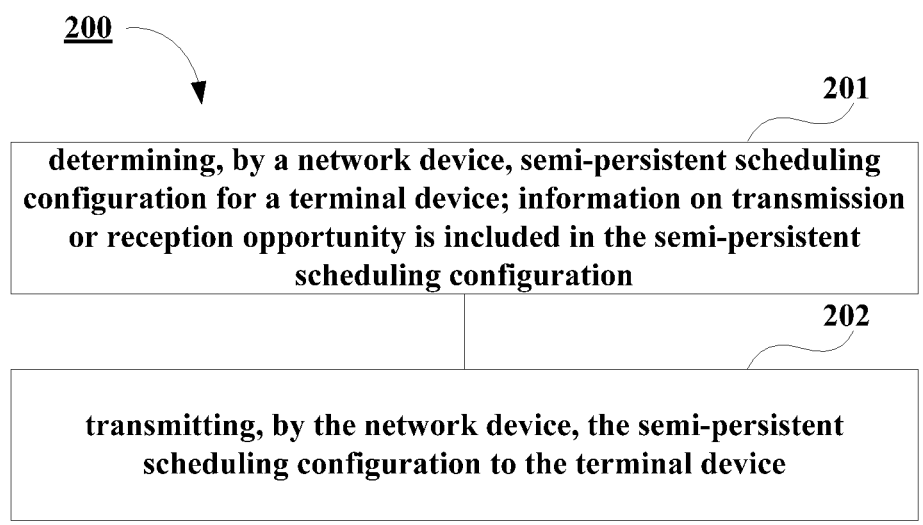
FIG. 2 is a flowchart which shows a method 200 for configuring SPS in accordance with an embodiment of the present disclosure.

FIG. 2 is a flowchart which shows a method 200 for configuring SPS in accordance with an embodiment of the present disclosure, and illustrates the method for configuring SPS by taking a network device as an example.

As shown in FIG. 2, the method 200 includes determining, by a network device, semi-persistent scheduling configuration for a terminal device, at block 201. In this disclosure, information on transmission or reception opportunity is included in the semi-persistent scheduling configuration.

As shown in FIG. 2, the method 200 further includes transmitting, by the network device, the semi-persistent scheduling configuration to the terminal device, at block 202.

In an embodiment, the information on transmission or reception opportunity may include (such as explicitly or implicitly) one or more of the following time units: frame, subframe, slot, mini-slot, OFDM symbol, transmission time interval (TTI).

In an embodiment, information of transmission or reception opportunity includes the time duration and occurrence time.

In an embodiment, the information of the transmission or reception opportunity occurrence time is the start symbol and/or the start slot of the transmission or reception opportunity.

In an embodiment, a semi-persistent scheduling interval may include one of the following time units: frame, subframe, slot, mini-slot, orthogonal frequency division multiplexing symbol, transmission time interval.

However, it is mot limited thereto, other time unit may be adopted in this disclosure. Next slot and/or mini-slot may be used as examples in this disclosure.

In an embodiment, the information on transmission or reception opportunity may at least include information on slot and/or mini-slot configuration, that is, information on slot and/or mini-slot may be included in the semi-persistent scheduling configuration; and the slot and/or mini-slot may be defined by number of OFDM symbols of an indicated numerology.

In an embodiment, the information on slot and/or mini-slot may be used to indicate the number of OFDM symbols in a slot and/or min-slot.

For example, information on slot and/or mini-slot (also may be referred to as slot configuration) may indicate the number of OFDM symbols in the slot/mini-slots when the slot and/or mini-slot may be defined by the number of OFDM symbols without numerology change, i.e., subcarrier space is not changed.

In an embodiment, the information on slot and/or mini-slot may further be used to indicate numerology configuration over which the semi-persistent scheduling configuration is to be operated.

For example, the slot configuration may further indicate the numerology configuration over which the SPS configuration is to be operated when the slot/mini-slot is defined by switching to a different numerology. The numerology configuration means the sub-carrier spacing.

In an embodiment, a time interval (may also be referred to as time unit) of the semi-persistent scheduling configuration may be a period of a transmission or reception opportunity occurrence.

For example, the time unit for the SPS period (semiPersistSchedIntervalUL or semiPersistSchedIntervalDL) configuration may be predefined to be a number of slot/mini-slot durations.

In an embodiment, a transmission opportunity or reception opportunity of the semi-persistent scheduling configuration is predefined or is configured with a parameter; a set of transmission opportunity or reception opportunity configurations are predefined and the parameter is used to indicate an index of a transmission opportunity or reception opportunity configuration.

For example, the time unit for the SPS period (semiPersistSchedIntervalUL or semiPersistSchedIntervalDL) configuration may be configured with an new parameter besides to be subframe duration, i.e. 1 ms. A set of time units may be predefined and the new parameter is used to indicate an index of the selected time unit.

In an embodiment, the method may further include: determining a transmission opportunity or a reception opportunity by using an index.

In an embodiment, transmission opportunity or the reception opportunity may be calculated based on one or more of a slot, mini-slot and OFDM symbol.

For example, the transmission opportunity or the reception opportunity for downlink within a semi-persistent scheduling period may be derived based on the following formula: $(X*SFN+slot)=[(X*SFN_{start\ time}+slot_{start\ time})+N*semiPersistSchedIntervalDL]$ modulo $(1024*X)$; where X is the total number of slots or mini-slots in a radio frame, SFN indicates system frame number, semiPersistSchedIntervalDL indicates the semi-persistent scheduling interval in the downlink, slot indicates the index of the subframe, slot or mini-slot, N indicates the index of the transmission opportunity or the reception opportunity.

For another example, the transmission opportunity or the reception opportunity for uplink within a semi-persistent scheduling period may be derived based on the following formula: $(X*SFN+slot)=[(X*SFN_{start\ time}+slot_{start\ time})+N*semiPersistSchedIntervalUL+Slot\_Offset*(N\ modulo\ 2)]$ modulo $(1024*X)$; where X is the total number of slots and/or mini-slots in a radio frame, SFN indicates system frame number, Slot_Offset is a predefined value according to a radio frame or subframe structure, semiPersistSchedIntervalUL indicates the semi-persistent scheduling interval in the uplink, slot indicates the index of the subframe, slot or mini-slot, N indicates the index of the transmission opportunity or the reception opportunity.

In this example, Slot_Offset may be predefined according to the radio frame/subframe structure considering the duplex, such as time division duplexing (TDD) or frequency division duplexing (FDD), and the UL/DL configuration of a radio frame or subframe.

In an embodiment, the transmission opportunity or the reception opportunity may be calculated based on a subframe.

For example, the formulas as LTE may be reused to determine the subframe number within which the slot for data transmission is located. The index of the slot/mini-slot for data transmission within the determined subframe for data may be further indicated by either a slot index field in the downlink control information (DCI) for SPS configuration activation.

Alternatively, the index of the slot/mini-slot for data transmission within the determined subframe for data may be predefined in specification, e.g. always slot/mini_slot of index 0 in the determined subframe, or it can be predefined that the UE can determine the slot/mini-slot index within a subframe based on its C-RNTI, e.g., slot/mini-slot index=C-RNTI mod (number of slot/mini-slots in one subframe). According to this option, the SPS period (i.e. semiPersistSchedIntervalUL or semiPersistSchedIntervalDL) can be still countered in subframes.

Figure 3:
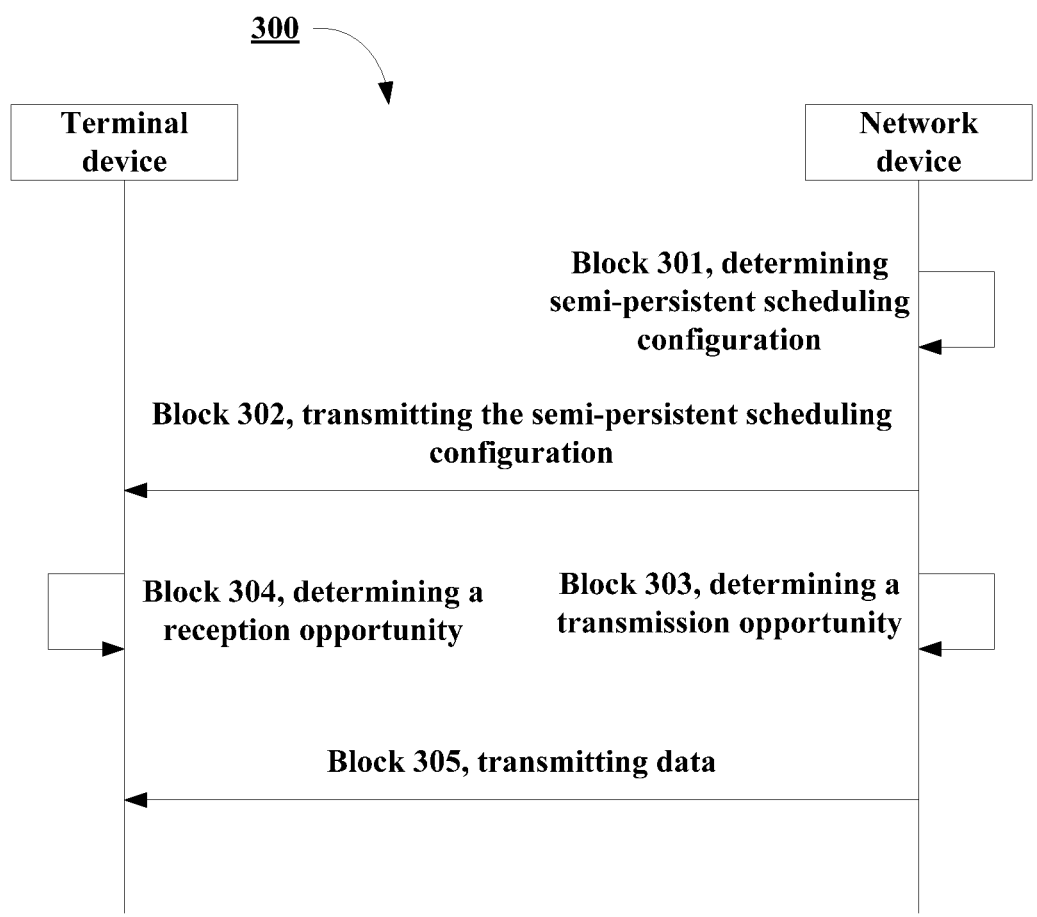
FIG. 3 is a diagram which shows a method 300 for configuring SPS in accordance with an embodiment of the present disclosure.

FIG. 3 is another diagram which shows a method 300 for configuring SPS in accordance with an embodiment of the present disclosure, and illustrates the method for configuring SPS by taking a network device and a terminal device as an example. In FIG. 3, the network device is regarded as a transmitting apparatus and the terminal device is regarded as a receiving apparatus.

As shown in FIG. 3, the method 300 includes determining, by a network device, semi-persistent scheduling configuration for a terminal device, at block 301. In this disclosure, information on transmission or reception opportunity is included in the semi-persistent scheduling configuration.

As shown in FIG. 3, the method 300 further includes transmitting, by the network device, the semi-persistent scheduling configuration to the terminal device, at block 302.

As shown in FIG. 3, the method 300 further includes determining, by the network device, a transmission opportunity by using an index, at block 303.

As shown in FIG. 3, the method 300 further includes determining, by the terminal device, a reception opportunity by using an index, at block 304.

As shown in FIG. 3, the method 300 further includes transmitting, by the network device, data in the transmission opportunity, at block 305; and the terminal device may receive the data in the reception opportunity.

Figure 4:
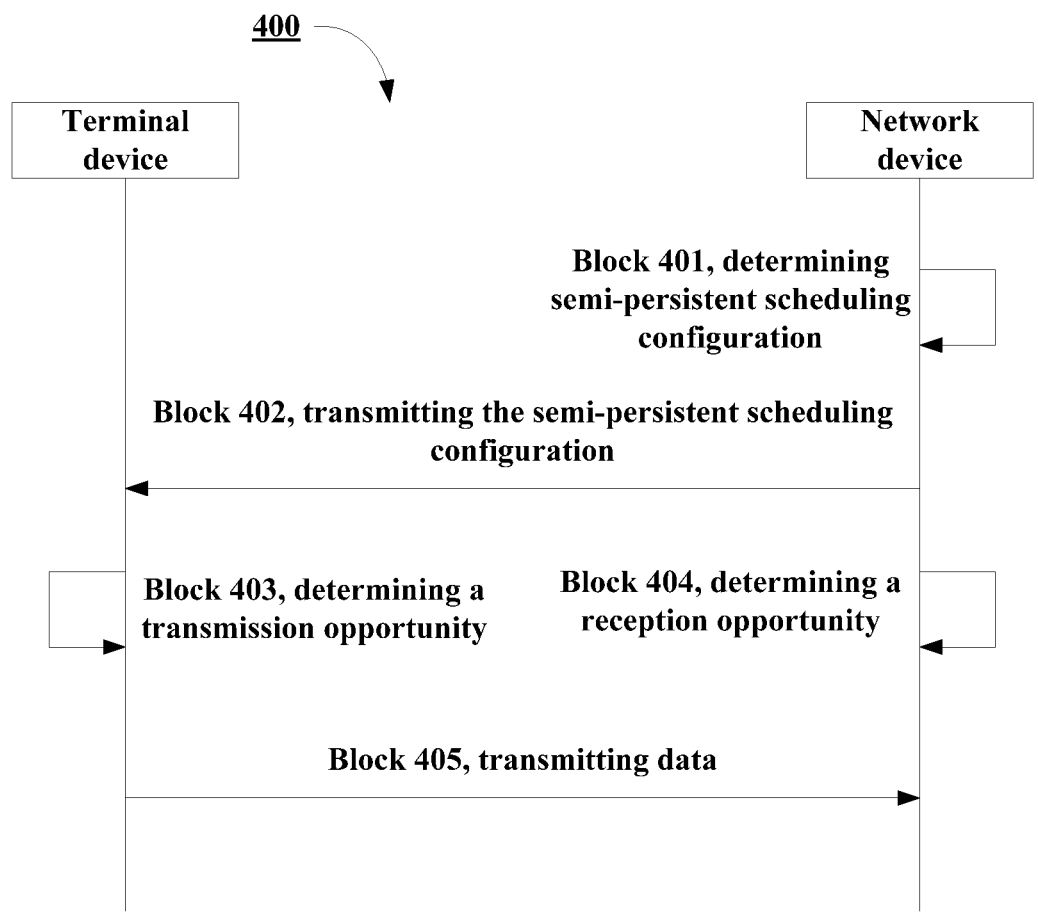
FIG. 4 is a diagram which shows a method 400 for configuring SPS in accordance with an embodiment of the present disclosure.

FIG. 4 is another diagram which shows a method 400 for configuring SPS in accordance with an embodiment of the present disclosure, and illustrates the method for configuring SPS by taking a network device and a terminal device as an example. In FIG. 4, the terminal device is regarded as a transmitting apparatus and the network device is regarded as a receiving apparatus.

As shown in FIG. 4, the method 400 includes determining, by a network device, semi-persistent scheduling configuration for a terminal device, at block 401. In this disclosure, information on transmission or reception opportunity is included in the semi-persistent scheduling configuration.

As shown in FIG. 4, the method 400 further includes transmitting, by the network device, the semi-persistent scheduling configuration to the terminal device, at block 402.

As shown in FIG. 4, the method 400 further includes determining, by the terminal device, a transmission opportunity by using an index, at block 403.

As shown in FIG. 4, the method 400 further includes determining, by the network device, a reception opportunity by using an index, at block 404.

As shown in FIG. 4, the method 400 further includes transmitting, by the terminal device, data in the transmission opportunity, at block 405; and the network device may receive the data in the reception opportunity.

It should be appreciated that FIGS. 3 and 4 are only examples of the disclosure, but it is not limited thereto. For example, the order of operations at blocks may be adjusted and/or some blocks may be omitted. Moreover, some blocks not shown in FIGS. 3 and 4 may be added.

In an embodiment, an index of a slot and/or mini-slot may be defined within a radio frame. For example, the slot index is defined within a radio frame, i.e. the slot index is within 0~X−1 within a radio frame when there are X slots within a radio frame (such as 10 ms).

Figure 5:
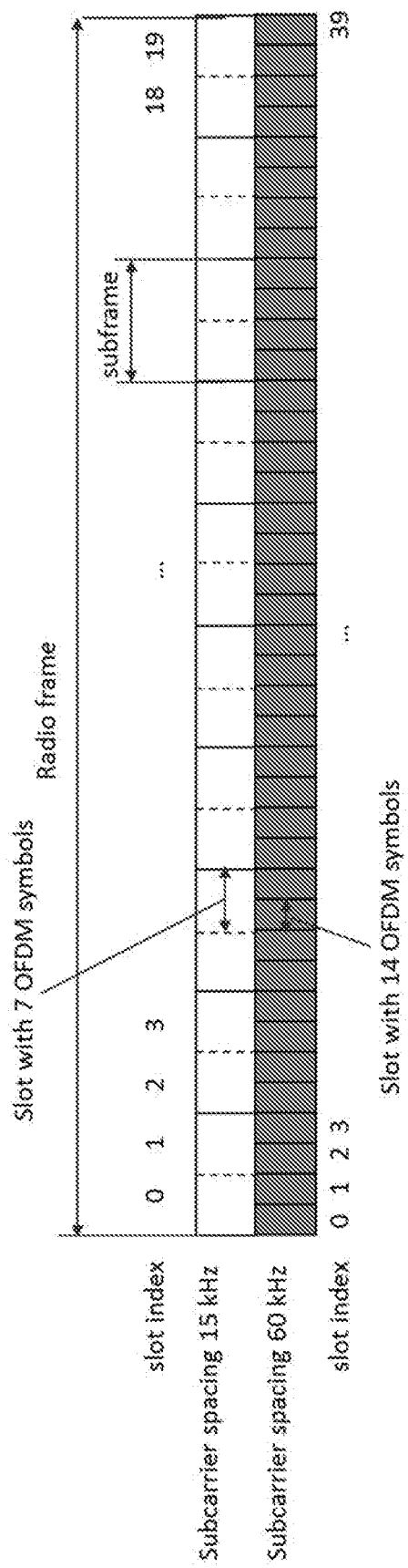
FIG. 5 is a diagram which shows an example of slot indexing within a radio frame in accordance with an embodiment of the present disclosure.

FIG. 5 is a diagram which shows an example of slot indexing within a radio frame in accordance with an embodiment of the present disclosure.

In an embodiment, an index of a slot and/or mini-slot may be defined within a subframe. For example, the slot index is defined within a subframe, with index within 0~Y−1 when there are Y slots within a subframe.

Figure 6:
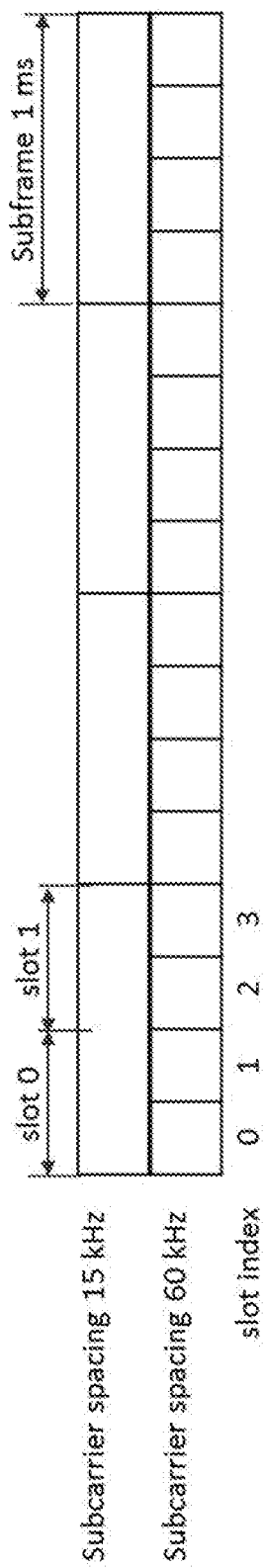
FIG. 6 is a diagram which shows an example of slot indexing within a subframe in accordance with an embodiment of the present disclosure.

FIG. 6 is a diagram which shows an example of slot indexing within a subframe in accordance with an embodiment of the present disclosure.

It should be appreciated that only operations related to this disclosure are illustrated in some embodiments. For the sake of simplicity, detail description of other operations, such as encoding, symbol modulating, resource mapping, are not illustrated in this disclosure.

As can be seen from the above embodiments, information on transmission or reception opportunity is included in SPS configuration when the network device configures the SPS for the terminal device. Therefore, SPS operation with multiple duration (such as slot and/or mini-slot) is enabled and there may be match between the network device and the terminal device when SPS transmission occupy just slots or mini-slots within one subframe.

Second Aspect of Embodiments

A method for configuring SPS is provided in an embodiment. The method is implemented at a terminal device as an example, and the same contents as those in the first aspect of embodiments are omitted.

Figure 7:
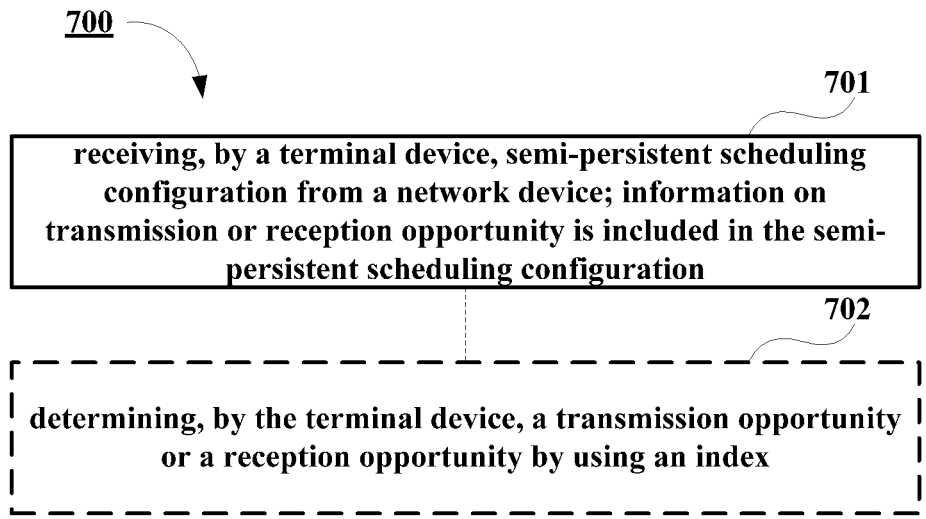
FIG. 7 is a flowchart which shows a method 700 for configuring SPS in accordance with an embodiment of the present disclosure.

FIG. 7 is another flowchart which shows a method 700 for configuring SPS in accordance with an embodiment of the present disclosure, and illustrates the method for configuring SPS by taking a terminal device as an example.

As shown in FIG. 7, the method 700 includes receiving, by a terminal device, semi-persistent scheduling configuration from a network device, at block 701. In this disclosure, information on transmission or reception opportunity is included in the semi-persistent scheduling configuration.

In an embodiment, the information on transmission or reception opportunity may include one or more of the following time units: frame, subframe, slot, mini-slot, orthogonal frequency division multiplexing symbol, transmission time interval.

In an embodiment, a semi-persistent scheduling interval may include (such as explicitly or implicitly) one of the following time units: frame, subframe, slot, mini-slot, orthogonal frequency division multiplexing symbol, transmission time interval.

In an embodiment, information on slot and/or mini-slot may be included in the semi-persistent scheduling configuration; and the slot and/or mini-slot may be defined by number of OFDM symbols of an indicated numerology.

For example, the information on slot and/or mini-slot may be used to indicate the number of orthogonal frequency division multiplexing symbols in a slot and/or min-slot. For another example, the information on slot and/or mini-slot may further be used to indicate numerology configuration over which the semi-persistent scheduling configuration is to be operated.

In an embodiment, a time interval of the semi-persistent scheduling configuration may be a period of a transmission or reception opportunity occurrence. Alternatively, a transmission opportunity or reception opportunity of the semi-persistent scheduling configuration may be predefined or be configured with a parameter; a set of transmission opportunity or reception opportunity configurations are predefined and the parameter is used to indicate an index of a transmission opportunity or reception opportunity configuration.

As shown in FIG. 7, the method 700 may include determining, by the terminal device, a transmission opportunity or a reception opportunity by using an index, at block 702.

In an embodiment, the transmission opportunity or the reception opportunity may be calculated based on one or more of a slot, mini-slot and OFDM symbol.

For example, the transmission opportunity or the reception opportunity for downlink within a semi-persistent scheduling period may be derived based on the following formula: $(X*SFN+slot)=[(X*SFN_{start\ time}+slot_{start\ time})+N*semiPersistSchedIntervalDL]$ modulo $(1024*X)$; where X is the total number of slots or mini-slots in a radio frame, SFN indicates system frame number, semiPersistSchedIntervalDL indicates the semi-persistent scheduling interval in the downlink, slot indicates the index of the slot or mini-slot, N indicates the index of the transmission opportunity or the reception opportunity.

For another example, the transmission opportunity or the reception opportunity for uplink within a semi-persistent scheduling period may be derived based on the following formula: $(X*SFN+slot)=[(X*SFN_{start\ time}+slot_{start\ time})+N*semiPersistSchedIntervalUL+Slot\_Offset*(N\ modulo\ 2)]$ modulo $(1024*X)$; where X is the total number of slots or mini-slots in a radio frame, SFN indicates system frame number, Slot_Offset is a predefined value according to a radio frame or subframe structure, semiPersistSchedIntervalUL indicates the semi-persistent scheduling interval in the uplink, slot indicates the index of the slot or mini-slot, N indicates the index of the transmission opportunity or the reception opportunity.

In an embodiment, the transmission opportunity or the reception opportunity may be calculated based on a subframe.

For example, an index of the slot or mini-slot for data transmission within the subframe may be indicated by downlink control information to activate the semi-persistent scheduling configuration, or is predefined.

In an embodiment, an index of a slot and/or mini-slot may be defined within a radio frame or within a subframe.

As can be seen from the above embodiments, information on transmission or reception opportunity is included in SPS configuration when the network device configures the SPS for the terminal device. Therefore, SPS operation with multiple duration (such as slot and/or mini-slot) is enabled and there may be match between the network device and the terminal device when SPS transmission occupy just slots or mini-slots within one subframe.

Third Aspect of Embodiments

An apparatus for configuring SPS is provided in an embodiment. The apparatus may be configured in the network device 101, and the same contents as those in the first aspect of embodiments are omitted.

Figure 8:
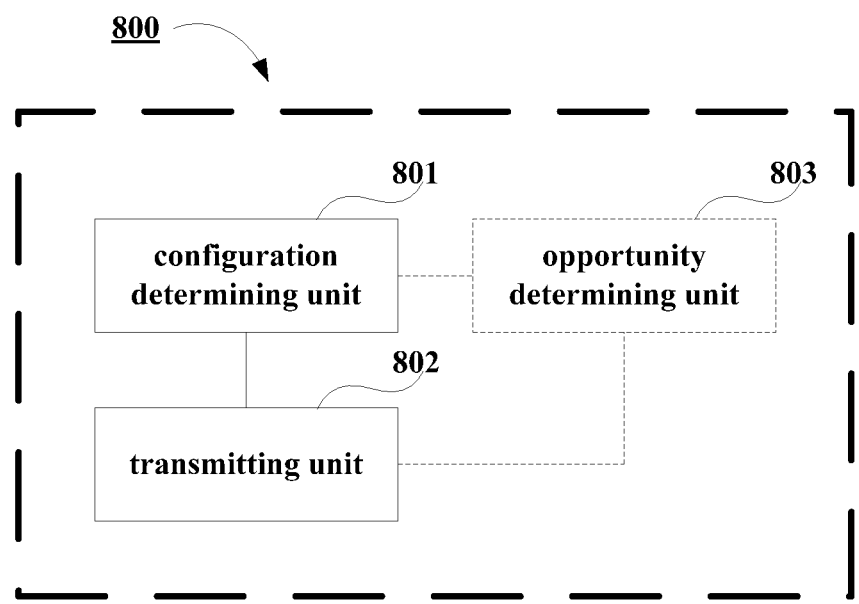
FIG. 8 shows a block diagram of an apparatus 800 for configuring SPS in accordance with an embodiment of the present disclosure.

FIG. 8 shows a block diagram of an apparatus 800 for configuring SPS in accordance with an embodiment of the present disclosure.

As shown in FIG. 8, the apparatus 800 includes: a configuration determining unit 801 configured to determine semi-persistent scheduling configuration for a terminal device; information on transmission or reception opportunity is included in the semi-persistent scheduling configuration; and a transmitting unit 802 configured to transmit the semi-persistent scheduling configuration to the terminal device.

As shown in FIG. 8, the apparatus 800 may further include: an opportunity determining unit 803 configured to determine a transmission opportunity or a reception opportunity by using an index.

It should be appreciated that components included in the apparatus 800 correspond to the operations of the method 200. Therefore, all operations and features described above with reference to FIG. 2 are likewise applicable to the components included in the apparatus 800 and have similar effects. For the purpose of simplification, the details will be omitted.

It should be appreciated that the components included in the apparatus 800 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 800 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 800 may be a part of a device. But it is not limited thereto, for example, the apparatus 800 may be the network device 101, other parts of the network device 101, such as transmitter and receiver, are omitted in the FIG. 8.

As can be seen from the above embodiments, information on transmission or reception opportunity is included in SPS configuration when the network device configures the SPS for the terminal device. Therefore, SPS operation with multiple duration (such as slot and/or mini-slot) is enabled and there may be match between the network device and the terminal device when SPS transmission occupy just slots or mini-slots within one subframe.

Fourth Aspect of Embodiments

An apparatus for configuring SPS is provided in an embodiment. The apparatus may be configured in the terminal device 102, and the same contents as those in the first or second aspect of embodiments are omitted.

Figure 9:
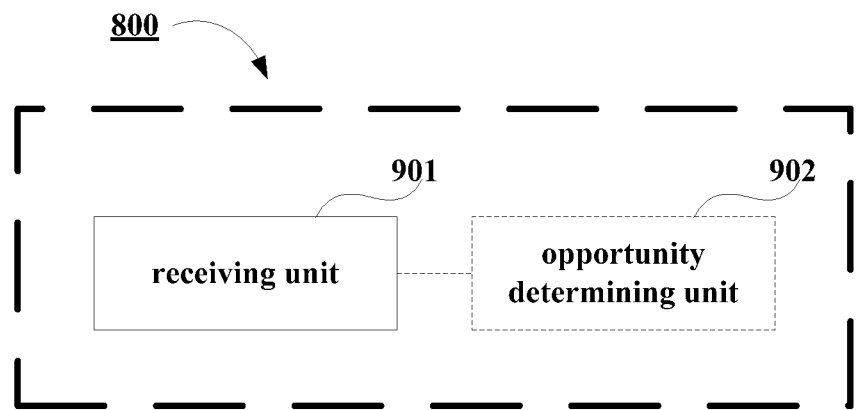
FIG. 9 shows a block diagram of an apparatus 900 for configuring SPS in accordance with an embodiment of the present disclosure.

FIG. 9 shows a block diagram of an apparatus 900 for configuring SPS in accordance with an embodiment of the present disclosure.

As shown in FIG. 9, the apparatus 900 includes: a receiving unit 901 configured to receive semi-persistent scheduling configuration from a network device; information on transmission or reception opportunity is included in the semi-persistent scheduling configuration.

As shown in FIG. 9, the apparatus 900 may further include: an opportunity determining unit 902 configured to determine a transmission opportunity or a reception opportunity by using an index.

It should be appreciated that components included in the apparatus 900 correspond to the operations of the method 700. Therefore, all operations and features described above with reference to FIG. 7 are likewise applicable to the components included in the apparatus 900 and have similar effects. For the purpose of simplification, the details will be omitted.

It should be appreciated that the components included in the apparatus 900 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 900 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 900 may be a part of a device. But it is not limited thereto, for example, the apparatus 900 may be the terminal device 102, other parts of the terminal device 102, such as transmitter and receiver, are omitted in the FIG. 9.

As can be seen from the above embodiments, information on transmission duration or reception duration is included in SPS configuration when the network device configures the SPS for the terminal device. Therefore, SPS operation with multiple duration (such as slot and/or mini-slot) is enabled and there may be match between the network device and the terminal device when SPS transmission occupy just slots or mini-slots within one subframe.

Fifth Aspect of Embodiments

A communications system is provided, as shown in FIG. 1, the communication system 100 includes a network device 101 configured to perform a method for configuring SPS according to the first aspect of embodiments and a terminal device 102 configured to perform a method for configuring SPS according to the second aspect of embodiments.

A device (such as a network device 101 or a terminal device 102) is provided in an embodiment, and the same contents as those in the first aspect and the second aspect of embodiments are omitted.

Figure 10:
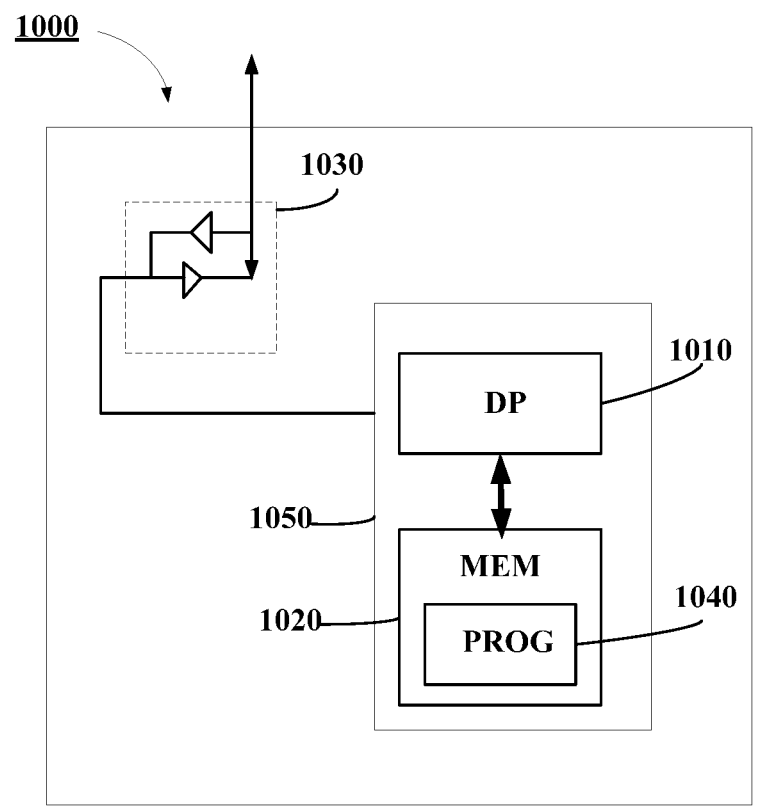
FIG. 10 is a simplified block diagram of a device that is suitable for implementing embodiments of the present disclosure.

FIG. 10 shows a simplified block diagram of a device 1000 that is suitable for implementing embodiments of the present disclosure. It would be appreciated that the device 1000 may be implemented as at least a part of, for example, the network device 101 or the terminal device 102.

Network device 101 includes processing circuitry, device readable medium, interface, user interface equipment, auxiliary equipment, power source, power delivery circuitry, and antenna. These components are depicted as single boxes located within a single larger box, and in some cases, contain additional boxes therein.

In practice however, a network device may include multiple different physical components that make up a single illustrated component (e.g., interface includes ports/terminals for coupling wires for a wired connection and radio front end circuitry for a wireless connection). As another example, network device may be a virtual network node. Similarly, network node may be composed of multiple physically separate components (e.g., a NodeB component and a RNC component, a BTS component and a BSC component, etc.), which may each have their own respective components.

In certain scenarios in which network device includes multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node may be configured to support multiple radio access technologies (RATs). In such embodiments, some components may be duplicated (e.g., separate device readable medium for the different RATs) and some components may be reused (e.g., the same antenna may be shared by the RATs).

As shown, the device 1000 includes a communicating means 1030 and a processing means 1050. The processing means 1050 includes a data processor (DP) 1010, a memory (MEM) 1020 coupled to the DP 1010. The communicating means 1030 is coupled to the DP 1010 in the processing means 1050. The MEM 1020 stores a program (PROG) 1040. The communicating means 1030 is for communications with other devices, which may be implemented as a transceiver for transmitting/receiving signals.

In some embodiments where the device 1000 acts as a network device. For example, the memory 1020 stores a plurality of instructions; and the processor 1010 coupled to the memory 1020 and configured to execute the instructions to: determine semi-persistent scheduling configuration for a terminal device; information on transmission or reception opportunity is included in the semi-persistent scheduling configuration; and transmit the semi-persistent scheduling configuration to the terminal device.

In an embodiment, the information on transmission or reception opportunity may include one or more of the following time units: frame, subframe, slot, mini-slot, orthogonal frequency division multiplexing symbol, transmission time interval.

In an embodiment, a semi-persistent scheduling interval may include one of the following time units: frame, subframe, slot, mini-slot, orthogonal frequency division multiplexing symbol, transmission time interval.

In an embodiment, information on slot and/or mini-slot configuration is included in the semi-persistent scheduling configuration; and the information on slot and/or mini-slot configuration is used to indicate the number of orthogonal frequency division multiplexing symbols in a slot and/or min-slot.

In an embodiment, the information on slot and/or mini-slot configuration is further used to indicate numerology configuration over which the semi-persistent scheduling configuration is to be operated.

In an embodiment, the slot and/or mini-slot may be defined by the number of orthogonal frequency division multiplexing symbols of an indicated numerology.

In an embodiment, the information on transmission or reception opportunity includes a time duration and occurrence time.

In an embodiment, a transmission opportunity or reception opportunity of the semi-persistent scheduling configuration is predefined or is configured with a parameter; a set of transmission opportunity or reception opportunity configurations are predefined and the parameter is used to indicate an index of a transmission opportunity or reception opportunity configuration.

In an embodiment, the processor 1010 is further configured to execute the instructions to: determine a transmission opportunity or a reception opportunity by using an index.

In an embodiment, the transmission opportunity or the reception opportunity is calculated based on one or more of a slot, mini-slot and OFDM symbol.

In an embodiment, the transmission opportunity or the reception opportunity for downlink within a semi-persistent scheduling period is derived based on the following formula: $(X*SFN+slot)=[(X*SFN_{start\ time}+slot_{start\ time})+N*semiPersistSchedIntervalDL]$ modulo $(1024*X)$; where X is the total number of slots or mini-slots in a radio frame, SFN indicates system frame number, semiPersistSchedIntervalDL indicates the semi-persistent scheduling interval in the downlink, slot indicates the index of the slot or mini-slot, N indicates the index of the transmission opportunity or the reception opportunity.

In an embodiment, the transmission opportunity or the reception opportunity for uplink within a semi-persistent scheduling period is derived based on the following formula: $(X*SFN+slot)=[(X*SFN_{start\ time}+slot_{start\ time})+N*semiPersistSchedIntervalUL+Slot\_Offset*(N\ modulo\ 2)]$ modulo $(1024*X)$; where X is the total number of slots or mini-slots in a radio frame, SFN indicates system frame number, Slot_Offset is a predefined value according to a radio frame or subframe structure, semiPersistSchedIntervalUL indicates the semi-persistent scheduling interval in the uplink, slot indicates the index of the slot or mini-slot, N indicates the index of the transmission opportunity or the reception opportunity.

In an embodiment, an index of the slot and/or mini-slot for data transmission within the subframe is indicated by downlink control information to activate the semi-persistent scheduling configuration, or is predefined when the transmission opportunity or reception opportunity is calculated based on a subframe.

In an embodiment, an index of a slot and/or mini-slot is defined within a radio frame or within a subframe.

In some other embodiments where the device 1000 acts as a terminal device. For example, the memory 1020 stores a plurality of instructions; and the processor 1010 coupled to the memory 1020 and configured to execute the instructions to: receive semi-persistent scheduling configuration from a network device; information on transmission or reception opportunity is included in the semi-persistent scheduling configuration.

In an embodiment, the information on transmission or reception opportunity may include one or more of the following time units: frame, subframe, slot, mini-slot, orthogonal frequency division multiplexing symbol, transmission time interval.

In an embodiment, a semi-persistent scheduling interval may include one of the following time units: frame, subframe, slot, mini-slot, orthogonal frequency division multiplexing symbol, transmission time interval.

In an embodiment, information on slot and/or mini-slot configuration is included in the semi-persistent scheduling configuration; and the information on slot and/or mini-slot configuration is used to indicate the number of orthogonal frequency division multiplexing symbols in a slot and/or min-slot.

In an embodiment, the information on slot and/or mini-slot configuration is further used to indicate numerology configuration over which the semi-persistent scheduling configuration is to be operated.

In an embodiment, the slot and/or mini-slot may be defined by number of orthogonal frequency division multiplexing symbols of an indicated numerology.

In an embodiment, the information on transmission or reception opportunity includes a time duration and occurrence time.

In an embodiment, a transmission opportunity or reception opportunity of the semi-persistent scheduling configuration is predefined or is configured with a parameter; a set of transmission opportunity or reception opportunity configurations are predefined and the parameter is used to indicate an index of a transmission opportunity or reception opportunity configuration.

In an embodiment, the processor 1010 is further configured to execute the instructions to: determine a transmission opportunity or a reception opportunity by using an index.

In an embodiment, the transmission opportunity or the reception opportunity is calculated based on one or more of a slot, mini-slot and OFDM symbol.

In an embodiment, the transmission opportunity or the reception opportunity for downlink within a semi-persistent scheduling period is derived based on the following formula: $(X*SFN+slot)=[(X*SFN_{start\ time}+slot_{start\ time})+N*semiPersistSchedIntervalDL]$ modulo $(1024*X)$; where X is the total number of slots or mini-slots in a radio frame, SFN indicates system frame number, semiPersistSchedIntervalDL indicates the semi-persistent scheduling interval in the downlink, slot indicates the index of the slot or mini-slot, N indicates the index of the transmission opportunity or the reception opportunity.

In an embodiment, the transmission opportunity or the reception opportunity for uplink within a semi-persistent scheduling period is derived based on the following formula: $(X*SFN+slot)=[(X*SFN_{start\ time}+slot_{start\ time})+N*semiPersistSchedIntervalUL+Slot\_Offset*(N\ modulo\ 2)]$ modulo $(1024*X)$; where X is the total number of slots or mini-slots in a radio frame, SFN indicates system frame number, Slot_Offset is a predefined value according to a radio frame or subframe structure, semiPersistSchedIntervalUL indicates the semi-persistent scheduling interval in the uplink, slot indicates the index of the slot or mini-slot, N indicates the index of the transmission opportunity or the reception opportunity.

In an embodiment, an index of the slot and/or mini-slot for data transmission within the subframe is indicated by downlink control information to activate the semi-persistent scheduling configuration, or is predefined when the transmission opportunity or the reception opportunity is calculated based on a subframe.

In an embodiment, an index of a slot and/or mini-slot is defined within a radio frame or within a subframe.

The PROG 1040 is assumed to include program instructions that, when executed by the associated DP 1010, enable the device 1000 to operate in accordance with the embodiments of the present disclosure, as discussed herein with the method 400 or 700. The embodiments herein may be implemented by computer software executable by the DP 1010 of the device 1000, or by hardware, or by a combination of software and hardware. A combination of the data processor

1010 and MEM 1020 may form processing means 1050 adapted to implement various embodiments of the present disclosure.

The MEM 1020 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1000, there may be several physically distinct memory modules in the device 1000. The DP 1010 may be of any type suitable to the local technical environment, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method in a network device, comprising:
   determining a semi-persistent scheduling configuration for a terminal device, wherein the semi-persistent scheduling configuration includes a plurality of transmission or reception opportunity configurations, each transmission or reception opportunity configuration including information on one or more transmission or reception opportunities;
   transmitting the semi-persistent scheduling configuration to the terminal device; and
   transmitting, to the terminal device, an index indicating a particular one of the transmission or reception opportunity configurations,
   wherein the information on transmission or reception opportunities comprises information on slot and/or mini-slot configuration, and the information on slot and/or mini-slot configuration indicates a number of orthogonal frequency division multiplexing symbols in a slot and/or min-slot.

2. The method according to claim 1, wherein the information on transmission or reception opportunity comprises a time duration and occurrence time.

3. The method according to claim 1, wherein the semi-persistent scheduling configuration includes a semi-persistent scheduling interval based on one of the following time units: frame, subframe, slot, mini-slot, orthogonal frequency division multiplexing symbol, and transmission time interval.

4. The method according to claim 1, wherein the information on slot and/or mini-slot configuration is further used to indicate a numerology configuration over which the semi-persistent scheduling configuration is to be operated.

5. The method according to claim 1, wherein the slot and/or mini-slot are/is defined by a number of orthogonal frequency division multiplexing symbols of an indicated numerology.

6. The method according to claim 1, wherein the method further comprises:
based on the index and the semi-persistent scheduling configuration, determining one or more transmission opportunities for downlink or one or more reception opportunities for uplink.

7. The method according to claim 6, wherein the transmission opportunities or the reception opportunities are determined based on the index and one or more of the following: a slot, mini-slot and orthogonal frequency division multiplexing symbol.

8. The method according to claim 7, wherein the transmission opportunities for downlink within a semi-persistent scheduling period are determined based on the following formula:

$$(X*SFN+\text{slot})=[(X*SFN\text{start time}+\text{slotstart time})+ N*\text{semiPersistSchedIntervalDL}]\text{modulo}(1024*X);$$

where X is a total number of slots or mini-slots in a radio frame, SFN indicates system frame number, semiPersistSchedIntervalDL indicates a downlink semi-persistent scheduling interval included in the semi-persistent scheduling configuration, slot indicates an index of a slot or mini-slot, N indicates the index of the particular transmission or reception opportunity configuration.

9. The method according to claim 7, wherein the reception opportunities for uplink within a semi-persistent scheduling period are determined based on the following formula:

$$(X*SFN+\text{slot})=[(X*SFN\text{start time}+\text{slotstart time})+ N*\text{semiPersistSchedIntervalUL}+\text{Slot\_Offset}*(N\text{ modulo }2)]\text{modulo}(1024*X);$$

where X is a total number of slots or mini-slots in a radio frame, SFN indicates system frame number, Slot_Offset is a predefined value according to a radio frame or subframe structure, semiPersistSchedIntervalUL indicates an uplink semi-persistent scheduling interval included in the semi-persistent scheduling configuration, slot indicates an index of a slot or mini-slot, N indicates the index of the particular transmission or reception opportunity configuration.

10. The method according to claim 6, wherein:
an index of a slot and/or mini-slot is defined within a radio frame or within a subframe;
when the index of the slot and/or mini-slot is defined within a subframe, the index is transmitted by downlink control information that activates the semi-persistent scheduling configuration; and
the index is predefined when the transmission or reception opportunities are determined based on a subframe.

11. A method in a terminal device, comprising:
receiving semi-persistent scheduling configuration from a network device, wherein the semi-persistent scheduling configuration includes a plurality of transmission or reception opportunity configurations, each transmission or reception opportunity configuration including information on one or more transmission or reception opportunities; and
receiving, from the network device, an index indicating a particular one of the transmission or reception opportunity configurations,
wherein the information on transmission or reception opportunities comprises information on slot and/or mini-slot configuration, and the information on slot and/or mini-slot configuration indicates a number of orthogonal frequency division multiplexing symbols in a slot and/or min-slot.

12. The method according to claim 11, wherein the information on transmission or reception opportunity comprises a time duration and occurrence time.

13. The method according to claim 12, wherein the semi-persistent scheduling configuration includes a semi-persistent scheduling interval based on one of the following time units: frame, subframe, slot, mini-slot, orthogonal frequency division multiplexing symbol, and transmission time interval.

14. The method according to claim 11, wherein the information on slot and/or mini-slot configuration is further used to indicate a numerology configuration over which the semi-persistent scheduling configuration is to be operated.

15. The method according to claim 11, wherein the slot and/or mini-slot are/is defined by a number of orthogonal frequency division multiplexing symbols of an indicated numerology.

16. The method according to claim 11, wherein the method further comprises:
based on the index and the semi-persistent scheduling configuration, determining one or more transmission opportunities for uplink or one or more reception opportunities for downlink.

17. The method according to claim 16, wherein the transmission opportunities or the reception opportunities are determined based on the index and one or more of the following: a slot, mini-slot and orthogonal frequency division multiplexing symbol.

18. The method according to claim 17, wherein the reception opportunities for downlink within a semi-persistent scheduling period are determined based on the following formula:

$$(X*SFN+\text{slot})=[(X*SFN\text{start time}+\text{slotstart time})+ N*\text{semiPersistSchedIntervalDL}]\text{modulo}(1024*X);$$

where X is a total number of slots or mini-slots in a radio frame, SFN indicates system frame number, semiPersistSchedIntervalDL indicates a downlink semi-persistent scheduling interval included in the semi-persistent scheduling configuration, slot indicates an index of a slot or mini-slot, N indicates the index of the particular transmission or reception opportunity configuration.

19. The method according to claim 18, wherein the transmission opportunities for uplink within a semi-persistent scheduling period are determined based on the following formula:

$$(X*SFN+\text{slot})=[(X*SFN\text{start time}+\text{slotstart time})+N*\text{semiPersistSchedIntervalUL}+\text{Slot\_Offset}*(N \text{ modulo } 2)]\text{modulo}(1024*X);$$

where X is a total number of slots or mini-slots in a radio frame, SFN indicates system frame number, Slot_Offset is a predefined value according to a radio frame or subframe structure, semiPersistSchedIntervalUL indicates an uplink semi-persistent scheduling interval included in the semi-persistent scheduling configuration, slot indicates an index of a slot or mini-slot, N indicates the index of the particular transmission or reception opportunity configuration.

20. The method according to claim 17, wherein:

an index of a slot and/or mini-slot is defined within a radio frame or within a subframe;

when the index of the slot and/or mini-slot is defined within a subframe, the index is received by downlink control information that activates the semi-persistent scheduling configuration; and the index is predefined when the transmission or reception opportunities are determined based on a subframe.

21. A network device, comprising a processor and a memory, wherein the memory contains instructions executable by the processor whereby the network device is configured to:

determine a semi-persistent scheduling configuration for a terminal device, wherein the semi-persistent scheduling configuration includes a plurality of transmission or reception opportunity configurations, each transmission or reception opportunity configuration including information on one or more transmission or reception opportunities;

transmit the semi-persistent scheduling configuration to the terminal device; and transmit, to the terminal device, an index indicating a particular one of the transmission or reception opportunity configurations, wherein the information on transmission or reception opportunities comprises information on slot and/or mini-slot configuration, and the information on slot and/or mini-slot configuration indicates a number of orthogonal frequency division multiplexing symbols in a slot and/or min-slot.

22. A terminal device, comprising a processor and a memory, wherein the memory contains instructions executable by the processor whereby the terminal device is configured to:

receive semi-persistent scheduling configuration from a network device, wherein the semi-persistent scheduling configuration includes a plurality of transmission or reception opportunity configurations, each transmission or reception opportunity configuration including information on one or more transmission or reception opportunities; and receive, from the network device, an index indicating a particular one of the transmission or reception opportunity configurations, wherein the information on transmission or reception opportunities comprises information on slot and/or mini-slot configuration, and the information on slot and/or mini-slot configuration indicates a number of orthogonal frequency division multiplexing symbols in a slot and/or min-slot.

* * * * *